United States Patent
Carrozza et al.

(10) Patent No.: US 6,697,344 B1
(45) Date of Patent: Feb. 24, 2004

(54) ONBOARD INITIAL ENTRY PROCESSOR FOR FACILITATING A SATELLITE COMMUNICATION

(75) Inventors: Dominic P. Carrozza, Redondo Beach, CA (US); Gregory S. Caso, Hermosa Beach, CA (US); Vincent C. Moretti, Torrance, CA (US); Reginald Jue, Manhattan Beach, CA (US); David A. Wright, Solana Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/270,167

(22) Filed: Mar. 16, 1999

(51) Int. Cl.[7] ............ H04B 7/185; H04B 7/212; H04B 7/19; H04J 3/06; H04Q 7/20
(52) U.S. Cl. ............ 370/316; 370/321; 370/503; 455/12.1; 455/13.2; 455/427
(58) Field of Search .............. 455/12.1, 13.1, 455/13.2, 427–431, 503, 504; 370/321, 350, 503, 324, 316, 508; 375/371, 373, 376, 343, 362–368; 342/357.06

(56) References Cited

U.S. PATENT DOCUMENTS

| | | | | |
|---|---|---|---|---|
| 4,307,461 A | * | 12/1981 | Brickman et al. | 370/58 |
| 4,359,733 A | * | 11/1982 | O'Neill | 343/6.5 LC |
| 4,507,781 A | * | 3/1985 | Alvarez, III et al. | 370/104 |
| 4,839,656 A | * | 6/1989 | O'Neill et al. | 342/357 |
| 5,613,195 A | * | 3/1997 | Ooi | 455/13.2 |
| 5,617,101 A | * | 4/1997 | Maine et al. | 342/358 |
| 5,790,939 A | * | 8/1998 | Malcolm et al. | 455/13.2 |
| 6,356,763 B1 | * | 3/2002 | Kangas et al. | 455/456 |

* cited by examiner

Primary Examiner—William Trost
Assistant Examiner—Meless Zewdy
(74) Attorney, Agent, or Firm—Harness, Dickey & Pierce, P.L.C.

(57) ABSTRACT

An initial entry processor (40) for use in a processing satellite (12) in a satellite based communications system (10) is provided having a buffer (62), a detection and timing circuit (64) and an identity circuit (66). The buffer (62) stores an initial entry burst (54) transmitted from at least one terrestrial terminal (14) to the processing satellite (12). The detection and timing circuit (64) detects the initial entry burst (54) and determines a time of arrival of the initial entry burst (54) relative to an initial entry burst slot (52). The identity circuit (66) determines an identity of the terrestrial terminal (14) that transmitted the initial entry burst (54) such that the time of arrival is used by the identified terrestrial terminal (14) during subsequent communications with the processing satellite (12).

17 Claims, 6 Drawing Sheets

ONBOARD INITIAL ENTRY PROCESSOR FOR FACILITATING A SATELLITE COMMUNICATION

BACKGROUND OF THE INVENTION

1. Field of the Invention

This invention relates generally to a communications system and, more particularly, to an initial entry processor in a processing satellite of a satellite based cellular communications system.

2. Discussion of the Related Art

In a satellite based cellular communications system, a central terrestrial control processor or network operations center (NOC) generally controls one or more communications satellites operating within the communications system. Each communications satellite within the communications system services multiple users located in multiple geographic areas, known as ground cells. The communications satellites receive and transmit data signals to and from the multiple users or terrestrial terminals positioned at the different locations within the ground cells on a point-to-point manner.

In a processing satellite using time division multiple access (TDMA) on the uplink from the terrestrial terminals to the processing satellite, it is necessary to provide a means of measuring the time of arrival of transmissions from the various terrestrial terminals in a given uplink beam so that the timing of the user transmissions may be adjusted to maintain a requisite precision. This process may be resolved into two distinct phases. One directed to the initial entry and the other directed to the long term maintenance. The initial entry process is typically performed only when the terrestrial terminal is initially commissioned. In the subject processing satellite system, the location of the terrestrial terminal in geocentric Cartesian coordinates is known at the time of commissioning to within a few hundred meters, as a result of GPS (global positioning system) measurements. Also, the position of the processing satellite is known very accurately, generally to within a few meters in the same coordinate system, by maintenance of an ephemeris at the network operations center (NOC) and by dissemination of the satellite's coordinates by means of ATM cells which are broadcast to all the terrestrial terminals through the processing satellite.

With this apriori information, the entering terrestrial terminal can target a special initial entry burst slot so that an initial entry burst (IEB) arrives at the processing satellite within about six microseconds of the true satellite timing. For an uplink transmission speed of about 500 kilosymbols per second, which is typical for the IEB, the amount of time uncertainty is equivalent to about three symbol epochs. The primary function for the initial entry processor (IEP) is to facilitate the process of refining the range precision from the uncertainty level that exists when the terrestrial terminal is being commissioned to a finer level needed for it to re-enter the system using only the ongoing synchronization maintenance provisions of the communications system. Quantitatively, this essentially amounts to shrinking the initial uncertainty at commissioning of plus/minus six microseconds to a lesser value of about plus/minus 0.25 microseconds to facilitate this re-entry.

If the initial entry procedures are not coordinated between the terrestrial terminals, there is a potential for collisions occurring between the terrestrial terminals during the initial entry process. Because of this, the initial entry processor must be able to distinguish between an initial entry burst from a single terrestrial terminal which is a valid condition and a corrupted initial entry burst from multiple terrestrial terminals which is an invalid condition. The initial entry processor must also be able to demodulate a portion of the initial entry burst to determine the identity of the commissioning user or terrestrial terminal. Moreover, the initial entry processor must function reliably under conditions wherein the signal amplitude may vary widely and where the timing clock available for forming demodulated samples cannot be altered. The initial entry processor must also be able to perform its task based on samples acquired with an arbitrary timing error. The initial entry processor must also operate with an unknown phase of the uplink signal prior to the initial entry burst arrivals.

What is needed then is an initial entry processor for a processing communications satellite that meets the above requirements. This will, in turn, provide an initial entry processor for a processing communications satellite that examines each initial entry burst slot to determine whether one and only one initial entry burst is present to provide robust collision detection, determine the timing relationship of the initial entry burst relative to the timing in the processing satellite, extract the data content of the initial entry burst to identify the terrestrial terminal, and provide information to an onboard processor in the processing satellite so that a report may be prepared and forwarded to the network operations center apprising the network operations center of the terrestrial terminals identity and the observed timing error. It is, therefore, an object of the present invention to provide a satellite based cellular communications system which utilizes an initial entry processor for a processing satellite.

SUMMARY OF THE INVENTION

In accordance with the teachings of the present invention, an initial entry processor for use in a processing satellite in a satellite based communications system is provided. The initial entry processor determines a time of arrival of an initial entry burst relative to an initial entry burst slot and identifies the particular terrestrial terminal that transmitted the initial entry burst. The time of arrival information used by the identified terrestrial terminal during subsequent communications with the processing satellite to reduce uplink timing between the terrestrial terminal and the processing satellite.

In one preferred embodiment, an initial entry processor for use in a processing satellite in a satellite based communications system includes a buffer, a detection and timing circuit, and an identity circuit. The buffer stores an initial entry burst transmitted from at least one terrestrial terminal to the processing satellite. The detection and timing circuit detects the initial entry burst and determines a time of arrival of the initial entry burst relative to the initial entry burst slot. The identity circuit determines an identity of the terrestrial terminal that transmitted the initial entry burst so that the time of arrival is used by the identified terrestrial terminal during subsequent communications with the processing satellite.

Use of the present invention provides an initial entry processor for use in a processing satellite in a satellite based communications system. As a result, the aforementioned requirements associated with initializing communication between a terrestrial terminal and a satellite have been met.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiment concerning an initial entry processor (IEP) for a processing satellite used in a satellite based cellular communications system is merely exemplary in nature and is not intended to limit the invention or its application or uses.

Figure 1:
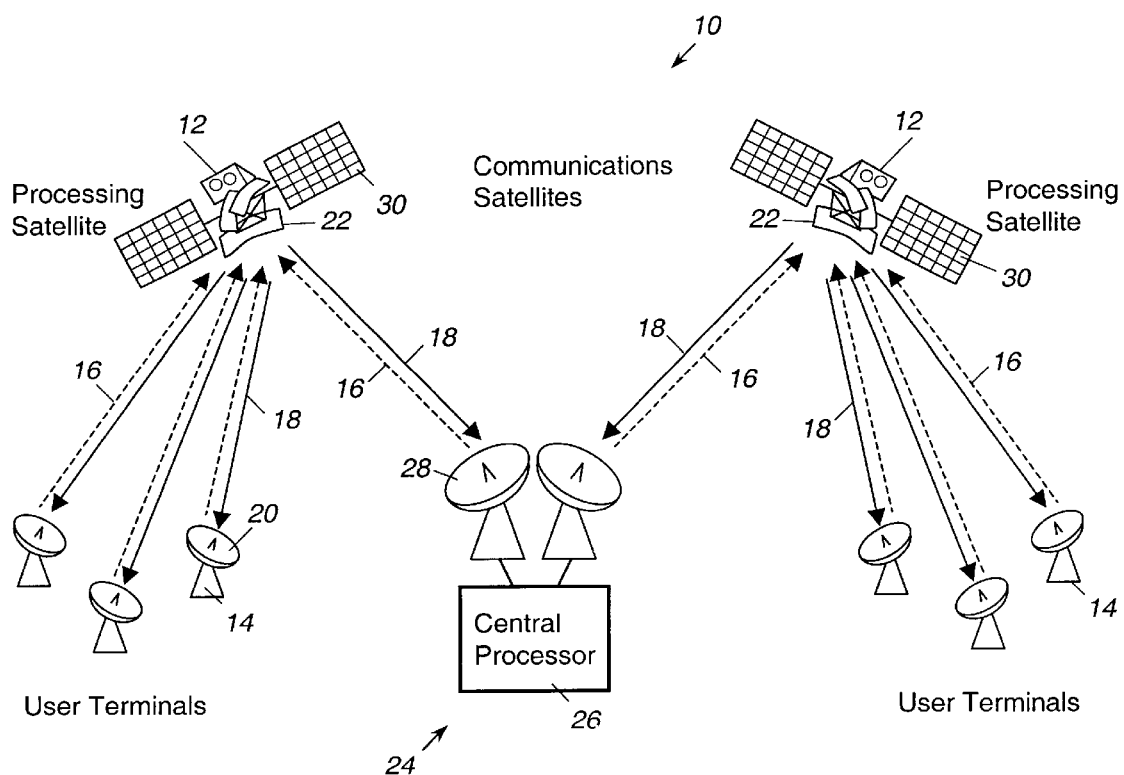
FIG. 1 is an overall satellite based cellular communications system block diagram.

Referring to FIG. 1, a satellite based cellular communications system 10 for supporting multiple users located in multiple geographic areas or ground cells is shown. The communications system 10 includes one or more processing communications satellites 12 operating generally in geosynchronous orbits. Each communications satellite 12 supports multiple terrestrial user terminals 14 positioned within various defined ground cells, further discussed herein. Each communications satellite 12 receives data signals from the user terminals 14 on communications uplinks 16 and transmits data signals to the user terminals 14 on the communications downlinks 18. Each user terminal 14 transmits data signals on the communications uplinks 16, which may include multiple carrier channels, and receives data signals on the communications downlinks 18, via an antenna 20. Each communications satellite 12 receives and transmits the data signals on the communications uplinks 16 and the communications downlinks 18, via a multi-beam antenna 22 or any other appropriate antenna to service the required region.

The satellite based cellular communications system 10 also includes a network operations center (NOC) 24 which includes a central control processor 26. The network operations center 24 generally controls the overall operations of each communications satellite 12 utilizing communications uplinks 16 and communications downlinks 18, via an antenna 28. These overall operations include maintenance of the geosynchronous orbit, positioning of solar collectors 30, initializing satellite system parameters, user billing, as well as other operational controls which are all well known in the art. The central control processor 26 in the network operations center 24 is preferably a general purpose programmable computer of appropriate computational power.

Figure 2:
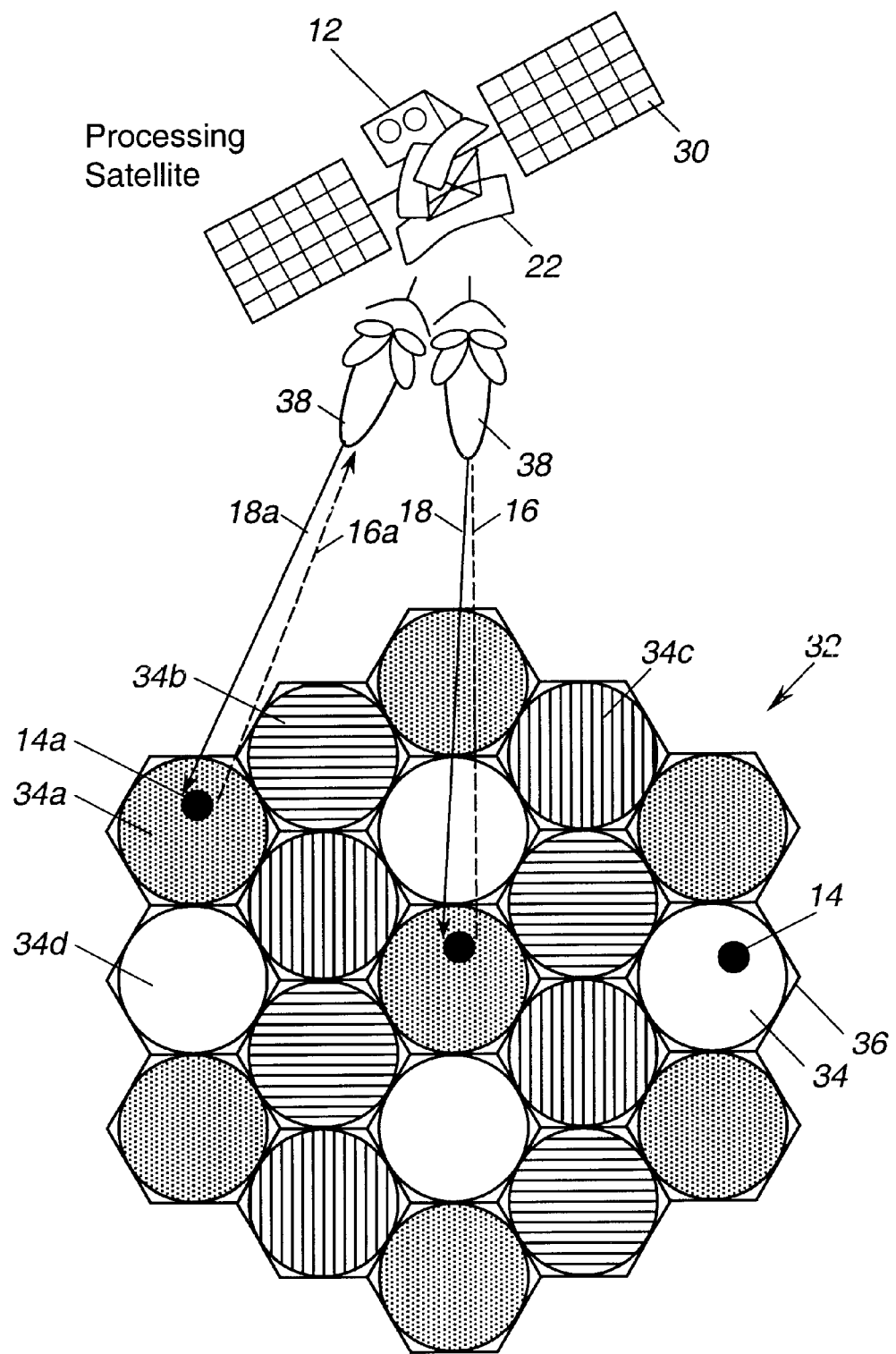
FIG. 2 is a detailed block diagram of communication uplinks and downlinks between terrestrial user terminals located within multiple ground cells and a processing communications satellite.

Referring now to FIG. 2, a processing communications satellite 12 is shown illuminating a coverage region 32, via antenna 22. The communications satellite 12 services the coverage region 32 which includes multiple ground cells 34 represented by each circular region. Each of the ground cells 34 is shown positioned within a hexagonal shaped region 36 that are the regions each individually illuminated by one antenna beam from the multi-beam antenna 22 on the communications satellite 12. Each ground cell 34 typically measures approximately 300 to 400 miles in diameter and is generally measured as the shortest distance between two points where the antenna gain is minimally acceptable. For example, this may be a point at which the antenna gain drops off by 5 or 6 dB.

The coverage region 32 is shown utilizing what is known as a 4-to-1 reuse where the coverage region 32 is separated into one of four types of ground cells 34a–34d. Of coarse, any other type of reuse pattern may also be employed. Each of the ground cells 34 having the same shading operate within the same frequency band. within each particular frequency band, many different carrier frequencies or channels carrier channels) are available to user or terrestrial terminals 14 operating within these ground cells 34. For example, each of the ground cells 34a may be allocated a first 100 MHz frequency band that is divided into 200 carrier channels. In this way, user terminal 14a within the ground cell 34a is allocated at least one of the 200 carrier channels and at least one of the time slots allocated to that particular carrier channel. Similarly, each of the ground cells 34b may be allocated a second 100 MHz frequency band, each of the ground cells 34c may be allocated a third 100 MHz frequency band and each of the ground cells 34d may be allocated a fourth 100 MHz frequency band. In other words, all of the ground cells identified as 34a will be operated within the same 100 MHz frequency band having the same 200 carrier channels available and so forth throughout each set of ground cells 34 within the coverage region 32.

User terminal 14a in ground cell 34a is operating within the first 100 MHz frequency band and say, for example, carrier channel one within this 100 MHz frequency band. The communications uplink 16a originating from user terminal 14a is directed into a main beam 38 of the multibeam antenna 22 servicing ground cell 34a. User terminal 14a is also bursting on and off within a particular time slot for carrier channel one within the 100 MHz frequency band. User terminal 14a may also use additional carrier channels within the 100 MHz frequency band and/or additional time slots depending on how much bandwidth the user terminal 14a requires to transmit all its data, via communications uplink 16a. It should further be noted that dedicated time slots within dedicated frequency or carrier channels are available in the uplink frequency band for each ground cell 34 to accommodate initial entry bursts, further discussed herein. Typically, there is one initial entry burst slot on one channel per frame for each distinct coverage pattern or ground cell 34 providing an initial entry opportunity about 10 times per second to user terminals 14 in each ground cell 34.

Each of the communications downlinks 18 from the communications satellite 12 to the multiple user terminals 14 within each group of ground cells 34a–34d operate on a single carrier frequency or channel and is generally always on. In other words, all of the ground cells 34a operate on a first carrier frequency, all of the ground cells 34b operate on a second; carrier frequency and so forth. The reason for the single carrier frequency being used for each group of ground cells 34a–34d on the communications downlinks 18 is because of the limited power constraints associated with operating the processing communications satellite 12.

Figure 3:
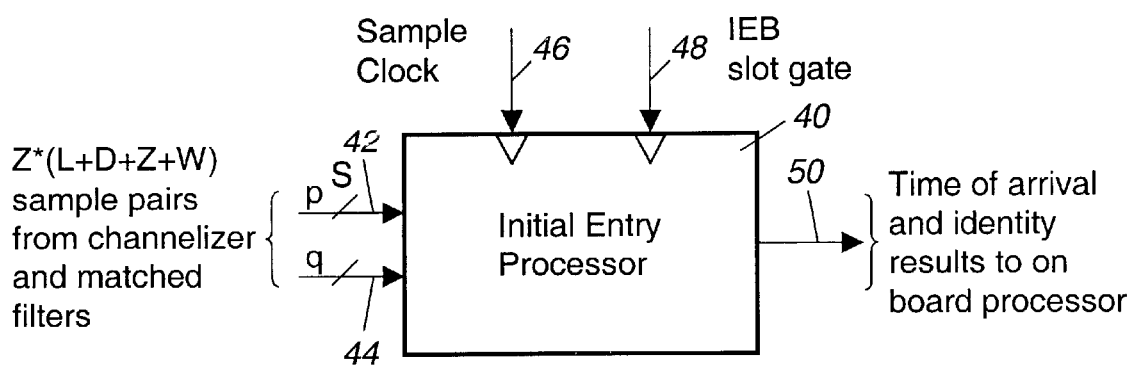
FIG. 3 is a broad block diagram of the inputs and outputs to an initial entry processor used in the processing communications satellite.

Turning to FIG. 3, the initial entry processor (IEP) 40 according to the teachings of the present invention is shown, along with its inputs and output relative to the processing satellite 12. In this regard, an initial entry processor 40 is located within each processing satellite 12 and may be embodied as a buffer plus a microprocessor or as a buffer plus special purpose digital logic. The initial entry processor 40 includes a pair of inputs 42 and 44 which receive digitized samples from a channelizer and matched filter within the processing satellite 12. The initial entry processor 40 also receives a sample clock at input 46 and an initial entry burst slot gate at input 48. The initial entry processor 40 is also provided with downstream access to the main control bus of the processing satellite 12, via output 50 so that its results may be made available to the on-board processor of the processing satellite 12 and the network operations center 24.

Figure 4:
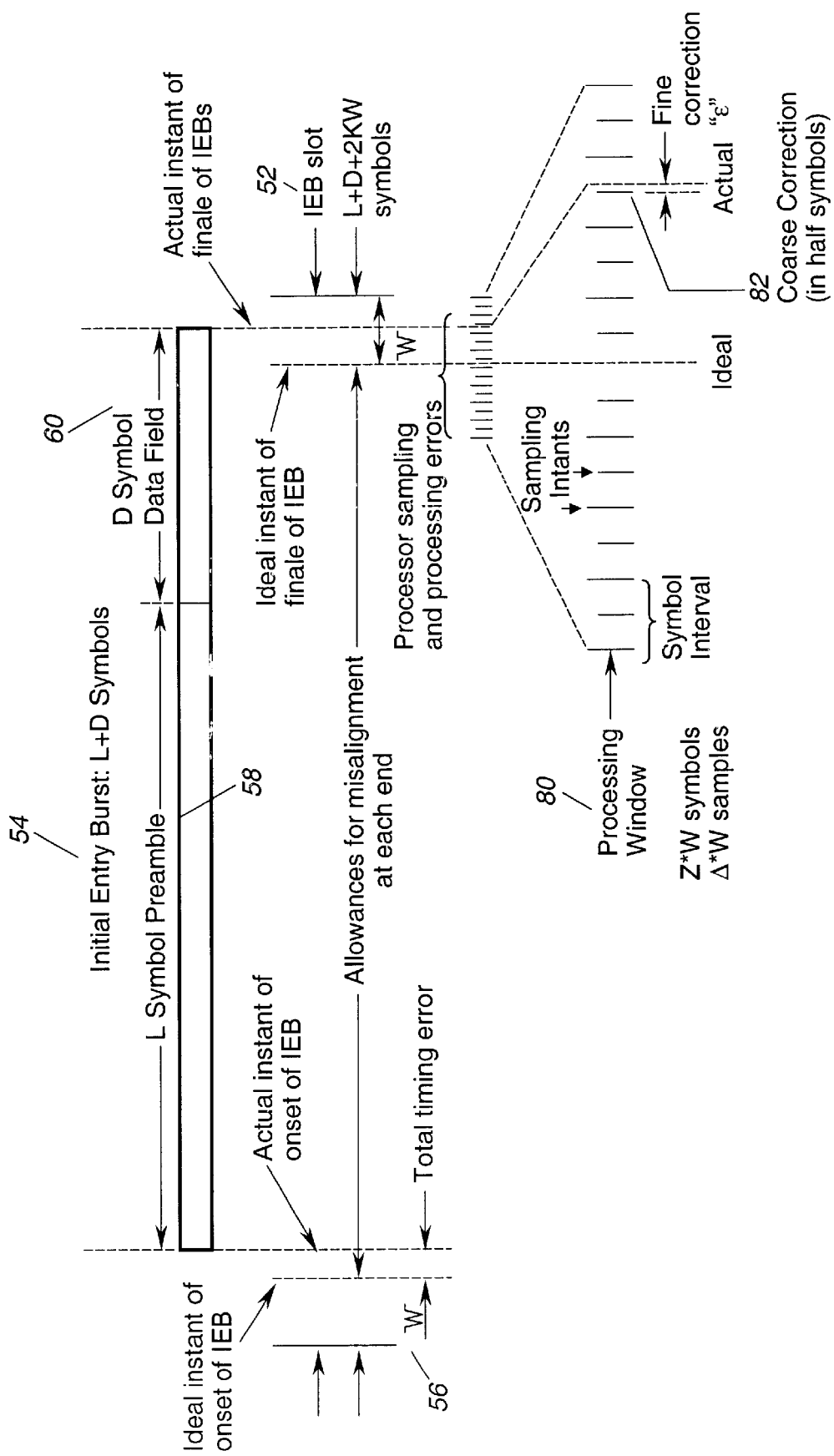
FIG. 4 is a detailed timing diagram illustrating an initial entry burst in an initial entry burst slot.

The initial entry processor 40 operates on the digitized samples from the upstream channelizer and matched filter which are delivered to the initial entry processor 40, via inputs 42 and 44, during an initial entry burst slot 52, as shown in FIG. 4. The digitized samples or bits arrive as quadrature pairs in the form of (p) and (q) and are at intervals separated by half a symbol epoch, which is typically about 1.0 microseconds for a representative signal speed of about 500 kilosymbols or bits per second. In other words, each quadrature arm (p) and (q) at inputs 42 and 44 together make a complex variable that is sampled twice per symbol.

The initial entry burst slot 52 is the dedicated time slot within dedicated frequency channels in the uplink frequency and time plan of each beam of the processing satellite 12. The initial entry burst slot 52 includes an initial entry burst (IEB) 54 and a pair of windows (w) 56 that have a sufficient number of symbols or bits to embrace the uncertainty of the time of arrival of the initial entry burst 54. The initial entry burst 54 is preferably 316 epochs (632 microseconds) plus two windows 56 (2 *W), where W is slighter larger than the worst case timing uncertainty. For example, where the timing uncertainty is three symbols or less, the window size is typically set to W=4. Thus, the initial entry burst slot 52 is about 324 symbols, where 316 symbols represent the initial entry burst 54 and 8 symbols represent two windows (2*w) 56 on either end of the initial entry burst slot 52. The number of samples sent to the initial entry processor 40 for processing is, therefore, twice the number of symbols or 648 samples in the representative case for both the (p) set and the (q) set.

As shown in FIG. 4, the initial entry burst 54 is comprised of two distinct arts. The first segment is an L symbol binary phase shift key (BPSK) preamble 58 hat is used to detect the presence of an initial entry burst 54 and determine the timing error present in the alignment of the initial entry burst 54 relative to the processing satellite's uplink timing. In other words, the time of arrival is related to the initial entry burst slot 52. The second segment is a D symbol data field 60 that identifies the user terminal 14 that forwarded or launched the initial entry burst 54 during the initial entry burst slot 52. Typical sizes for these distinct portions is L=256 symbols for the preamble 58 and D=60 symbols for the data field 60. Accordingly, the initial entry burst 54 equals 316 symbols (i.e., 256 L symbols+60 D symbols) which is designed to be received within the initial entry burst slot 52 of 324 symbols (i.e., 316 symbols+window 52 of 2*w where w=4). This allows for misalignment of +/−4 for the initial entry burst 54 relative to the initial entry burst slot 52.

Figure 5:
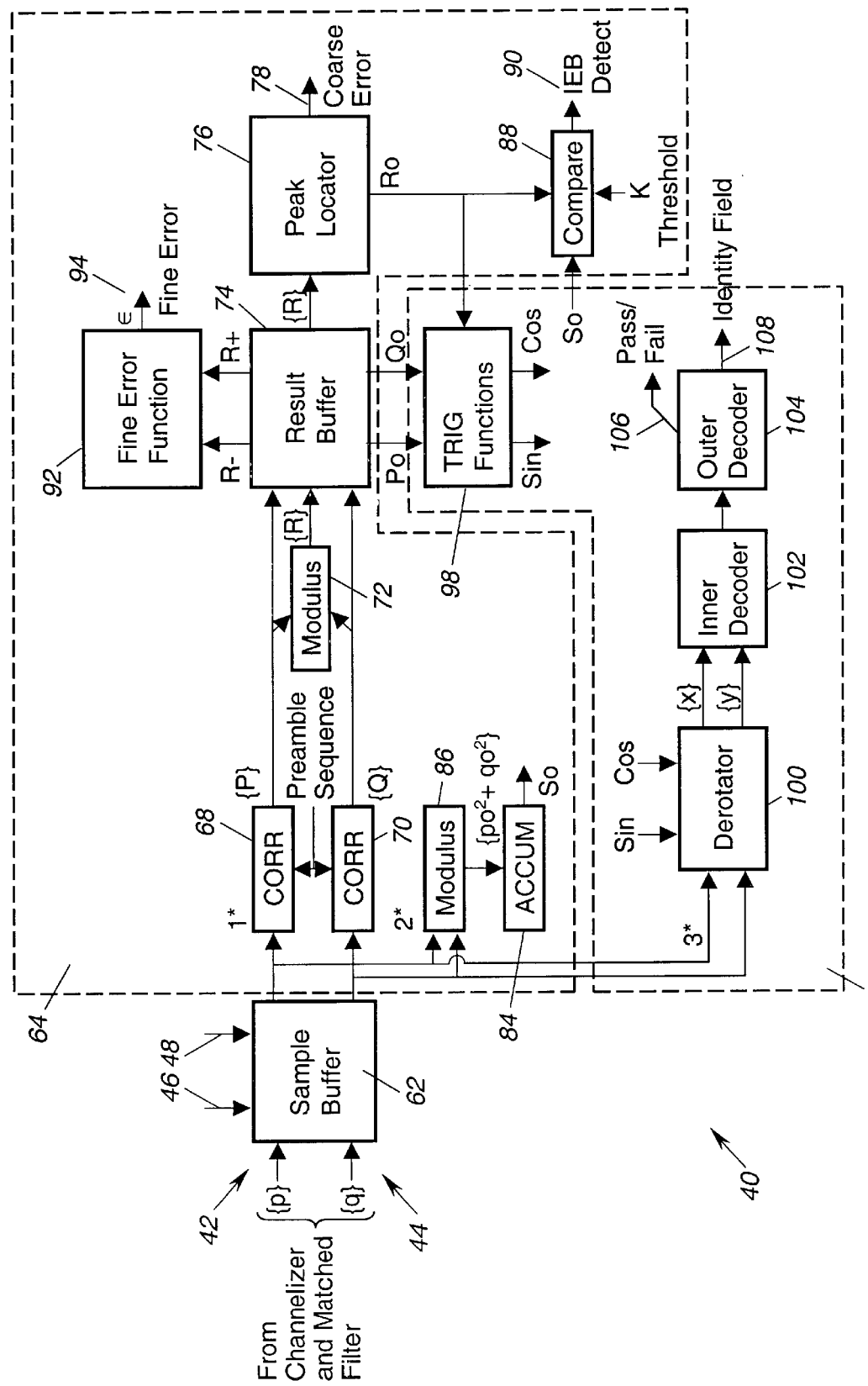
FIG. 5 is a detailed block diagram of the initial entry processor used in the processing communications satellite.

Turning to FIG. 5, a detailed schematic block diagram of the initial entry processor 40 according to the teachings of the present invention is shown. The initial entry processor 40 essentially performs two (2) processes. In the first step, detection of the initial entry burst 54 and a measurement of its time of arrival related to the initial entry burst slot 52 is performed using the L symbol preamble 58. In this regard, the initial entry processor 40 begins by capturing and buffering a sample set corresponding to the next scheduled initial entry burst slot 52, in a sample buffer 62. The sample buffer 62 receives the initial entry burst 54 at inputs 42 and 44 (i.e., p and q), as well as the sample clock 46 and the IEB slot gate 48. In the second step, the initial entry processor 40 extracts the identity of the user terminal 14 using the D symbol data field 60. The detection and time measurement function of the first step is performed by a detection and timing circuit 64 and the identity function of the second step is performed by an identity circuit 66.

Specifically, the: sample set received by the sample buffer 62 is:

$$pe(n), po(n), qe(n), qo(n) \text{ where } n=1 \text{ to } N.$$

In this notation, p and q denote the processing arm to which the sample belongs, e and o denote, respectively, even or odd samples separated by half a symbol epoch, and n indexes the order of the symbol epochs at which the sample was formed with N being the number of symbols in the initial entry burst slot 52. In other words, the channelizer and matched filter of the processing satellite 12 sample twice per symbol to measure timing error which produces two sample sets. The first set is the even set (e) at the point of convergence and the second set is the odd set (o), one half a symbol epoch away from the point of convergence where timing error is determined. Each sample is the complex number p and, q, where, four (4) scaler numbers are provided for every symbol going into the initial entry processor 40.

In order to detect an initial entry burst 54, as well as its timing, the samples in the sample buffer 62 are forwarded to a pair of correlators 68 and 70 in the detection and timing circuitry 64. The correlators 68 and 70 correlate the samples in each of the quadrature arms versus the known pattern for the L symbol preamble 58 (i.e. L=256). This correlation is repeated at intervals of half a symbol epoch over a total interval of 2*w (i.e., 8) symbol epochs. A total of 4*w processing events or distinct correlation actions are performed with the correlators 68 and 70 to produce the correlated data or results Pe(m), Po(m), Qe(m), Qo(m) where m ranges from 1 to 2*w. This provides the following relationship:

$$Pe(m)=\text{SUM}[l=1 \text{ to } L:pe(l+m-1)*t(l)] \; 1 \leq m \leq 2*w$$

where t(l) is a bipolar sequence (i.e., t(l)=+/−1:l=1 to L) corresponding to the timing sequence of the preamble 58 of the initial entry burst 54. The same relationships are applicable for Qe(m), Po(m) and Qo(m). In other words, the correlator 68 will take (p) and map it into (P) by correlating against the time template t(l) that is expected in the L symbol preamble 58, with the template t(l) being a sequence of+/− 1's that provide for good properties for determining and locating timing. Correlator 70 also correlates (q) into (Q) in the same manner.

Each correlation from correlators 68 and 70 is then applied to a modulus block 72. The modulus block 72 combines the correlation data in pairs to produce an even modulus Re(m) and an odd modulus Ro(m) which are the magnitude of the P and Q correlations for the odd and even sets. The even modulus Re(m) may be represented by:

$$Re(m)=SQR[Pe(m)^2+Qe(m)^2]$$

with an identical formula used for the odd modulus Ro(m). These mathematical operations may be performed in the modulus block 72 using a look-up table or a microprocessor. The modulus data is then forwarded to a result buffer 74 that stores the modulus values over the period of 4*w. The correlated values Pe(m), Po(m), Qe(m) and Qo(m) are also forwarded to the result buffer 74 for subsequent use in identifying which user terminal 14 is sending the initial entry burst 54.

The set of Re(m) and Ro(m) modulus data is then scanned in a peak locator 76 to locate the largest or maximum modulus value R0 over the period of 4*w (i.e., 16). The maximum R0 can either be the even Re(m) or the odd Ro(m) modulus, but R0 cannot be for m=1 when even or for m=2*w when odd. In other words, the end points of the window 56 are not admissible. If the maximum R0 is so located, the initial entry processor 40 will reject the initial entry burst 54 and take no further processing action until the next occurrence of an initial entry burst 54. The peak locator 76 also determines a coarse error 78 based upon the maximum modulus R0.

In this regard, R0 represents an integer number of one half symbols of misalignment of the actual initial entry burst 54 relative to the ideal instant of the initial entry burst 54, as shown in FIG. 4. In other words, the peak locator 76 will identify to the nearest one half symbol epoch, one of the sixteen locations in the processing window 80 where the initial entry burst 54 ends relative to the ideal instant of the ending of the initial entry burst 54 to identify the coarse error 78. As shown in FIG. 4, the actual instant of the ending of the initial entry burst 54 is 2.5 symbols late, identified by reference numeral 82. Thus, the coarse error 78 is 2.5 symbols or 5 microseconds.

Once the coarse error 78 is determined by the peak locator 76, the initial entry processor 40 performs an energy measurement by an accumulator 84, via a modulus 86 to provide a normalizing factor. This energy measurement is:

$$S0=SQR[SUM[l=1 \text{ to } L: p0(l)^2+q0(l)^2]] \quad 1 \leq m \leq 2*w$$

using the same sample set (p0, q0) as that used in forming R0 (i.e., same value of m and the even or odd sample set as applicable), with the mathematical operation performed either by a look up table or a microprocessor. In other words, the accumulator 84 takes the modulus of the samples (p) and (q) and forms a square modulus from that to yield energy measurement S0. This energy measurement S0 is applied to a compare block 88 which receives S0, R0 and a K threshold. As a test for the presence of an initial entry burst 54, the initial entry processor 40 compares R0 with K*S0 in the compare block 88, where K is in the range of 0 to L and is typically around L/2 or 128 in the typical case. This process is known as a CFAR (constant false alarm rate) test for burst presence. If R0 does not exceed K*S0, then the initial entry processor 40 rejects the initial entry burst 54 and takes no further processing action until the next initial entry burst slot 52 occurs. Otherwise, the initial entry processor 40 declares that an initial entry burst 54 is present in its initial entry burst slot 52 with an IEB detection symbol 90 and proceeds to estimate the time of arrival of the initial entry burst 54.

Figure 6:
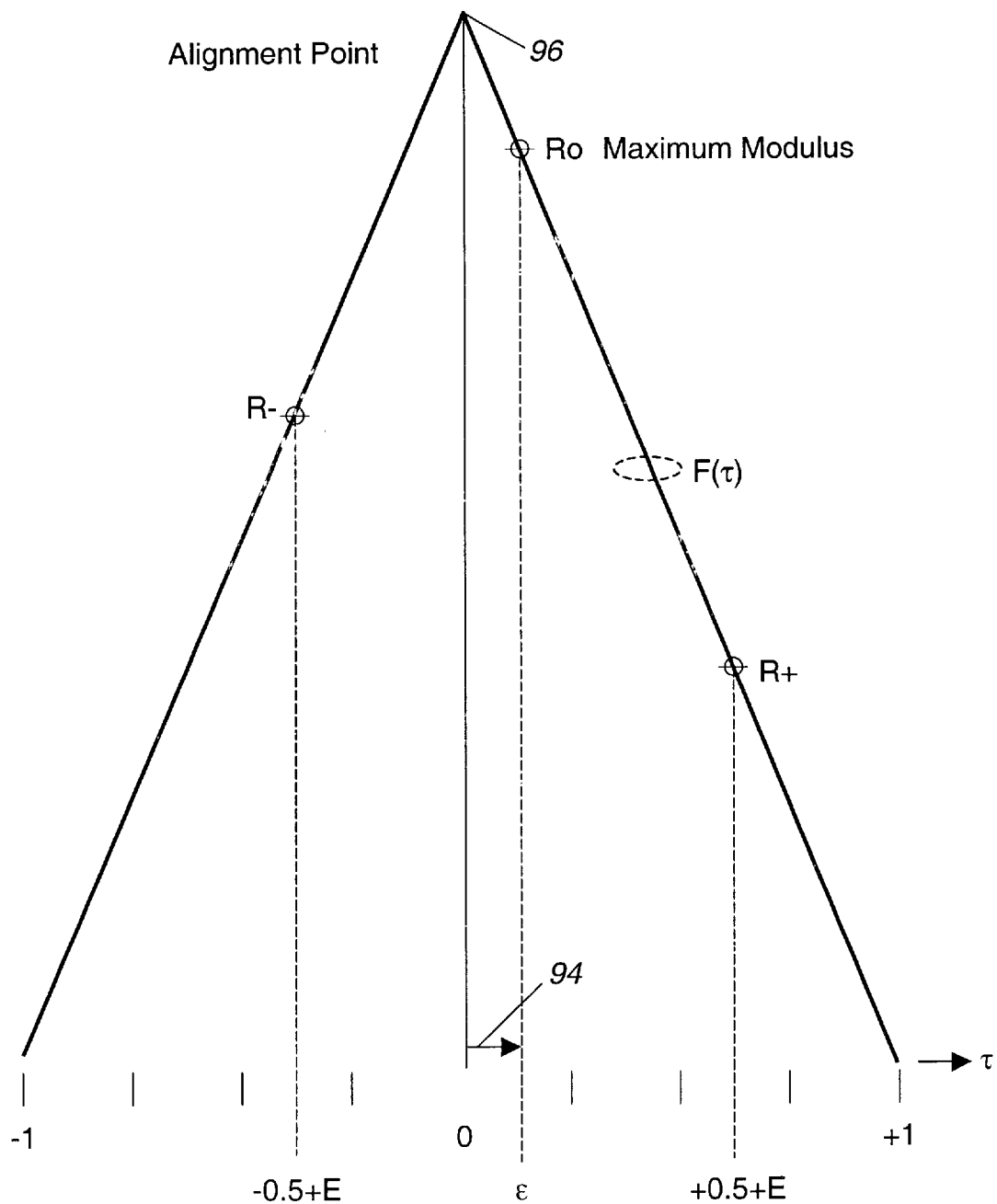
FIG. 6 is a graph plotting a time arrival of an initial entry burst along with its fine timing error $\epsilon$.

The coarse error 78 to the nearest one-half symbol is obtained from the value of m and the even/odd status of the correlations producing R0. The initial entry processor 40 refines this estimate in a fine error function block 92 using R− and R+ which are the values of R that immediately precede and follow R0, respectively. In other words, once the peak locator 76 locates the max R0, there is a follower (R+) and a predecessor (R−). The actual remaining timing error or fine error ($\epsilon$) 94 should be less than T/4, where T is the symbol epoch duration (otherwise the relationship of the previously located maximum R0 would not be valid since the correlated values peak at the point of correct timing). For simplicity of notation, $\epsilon$ is normalized to T so that $-0.25 \leq \epsilon \leq +0.25$. In this normalized time scale, R−, R0, R+ occur at $-0.5+\epsilon$, $\epsilon$, $+0.5+\epsilon$, respectively, as shown in FIG. 6. What this means is that after the coarse error 78 is found to the nearest half symbol, the remaining error $\epsilon$ should not be more than one half between a sample (i.e., 0.25 symbol epochs) which equals T/4.

From linear system theory, it may be shown that, in the absence of noise or other such impairments, R−, R0, R+ are constrained to lay on a locus the shape of which depends on the signal waveform and the filter used in demodulating the signals and the preamble template function A(l). Let this function be f($\tau$) where again its time scale is normalized to the symbol epoch. Usually, f($\tau$) is the correlation function of the symbol waveform or the timing error. Then R−, R0, R+ are commonly scaled versions of f($-0.5+\epsilon$), f($\epsilon$), and f($+0.5+\epsilon$), respectively, and the logarithm of the ratio $\lambda$=R−/R+ may be written as:

$$\log[R-/R+]=\log[f(-0.5+\epsilon)/f(+0.5+\epsilon)]=\rho(\epsilon)$$

which is independent of the scaling and thus of any gain variation conditions to which the initial entry burst 54 may have been exposed. From the relation above, it is evident that the right hand side is a function of the single unknown $\epsilon$, i.e. $\rho(\epsilon)$ as written. For practical cases, $\rho(\epsilon)$ is a single valued function (and therefore has a unique inverse $\epsilon=\upsilon(\lambda)$ and has the same sign as $\epsilon$. That is, when $\epsilon$ is positive (initial entry burst 54 is late relative to the sample instant at which R0 occurred), then R−>R+ and their ratio exceeds unity, as shown in FIG. 6. Forming the refined estimate of the timing error by the fine error function block 92 is then simply achieved by a look up table or by a microprocessor that is entered with R− and R+ and which returns $\epsilon$ or the fine error 94.

In this regard, FIG. 6 shows the response of R in the vicinity of correct time alignment that would apply if a filter that is matched to the L symbol preamble 58 is used in the channelizer and matched filter before the sample buffer 62. FIG. 6 shows that when the point 96 of alignment is approached the response is a strong peak. By using a rectangular modulation in the uplink 16, the triangular response, as shown in FIG. 6, is obtained, with a peak 96 at 0 and the response being symmetric about 0 after going through 0 at −1 and +1. After the coarse error 78 is determined, the fine error 94 or $\epsilon$, as shown in FIG. 6 relates with the named value R−, R0 and R+.

It should further be noted that with a larger fine error 94, the larger the ratio between R−/R+ and if $\epsilon$=0, then R− and R+ are equal. As a refinement of this technique, these variables may be normalized by S0 prior to the look up, to reduce the sensitivity of the process to any gain variations.

As a specific example of this processing, consider the case where rectangular QPSK is used with matched filtering (e.g. integrate and dump). It is easily shown that:

$$\lambda=R-/R+=(1+2*\epsilon)/(1-2*\epsilon)$$

and that $$\epsilon=-0.5*(1-\lambda)/(1+\lambda)$$

For example, with a normalized timing error of +0.1, the respective relative values (absent noise or other channel impairment) of R−, R0, R+ are 6, 9, and 4. Thus, $\lambda$ has the value 6/4 and $\lambda$=1.5. Substituting, $\epsilon$=−(1−1.5)/(1+1.5)/2= 0.5/5=0.1, per the assumption. The resultant fine error 94 of $\epsilon$ is in digital form with a resolution adequate for the intended purpose, typically 6 bits.

Once the first phase of the initial entry processor's 40 operation has been completed regarding the timing error of the initial entry burst 54, the second phase of the initial entry processor 40 begins. In this regard, the second phase of the initial entry processor's 40 operation involves extracting the identity of the terrestrial terminal 14 from the data field or D symbol portion 60 of the initial entry burst 54. As a first step, the initial entry processor 40 categorizes the remaining samples in the result buffer 74 based on the index at which R0 was located. The point in the result buffer 74 corresponding to R0 is recategorized as even and corresponding to l=1, which essentially removes all of the timing error except for the fine error 94 (i.e., $\epsilon$). For the remaining of the processing steps, the odd samples have no relevance and only the even samples will be used for the data extraction process. In addition, there may also be some degradation in subsequent processing steps as a result of the residual timing error $\epsilon$, however, this level of timing accuracy is sufficient to permit the data field 60 of the initial entry burst 54 to be processed. In other words, one half of the signals are no longer relevant, therefore, the better of the two sets (i.e., odd or even) are taken plus an offset by the coarse error 78 to get a frame alignment.

The initial entry processor 40 then proceeds to form an estimate of the SIN and COS of the phase of the incoming signal based on the values of P0 and Q0 of the correlated variables associated with R0. In other words, the previous modulus steps removed any dependency upon phase which is acceptable to determine the coarse error 78 and the fine error 94, but now we need to estimate the phase and remove the effects of the phase to recover the data field 60 to determine the identity of the terrestrial terminal 14., This estimate involves a simple ratio as $COS(\phi)=P0/R0$ and $SIN(\phi)=Q0/R0$ which: may again be performed by either a look up table or a microprocessor in the trig function block 98 in the identity circuitry 66. In this regard, the trig function block 98 takes P0 and Q0 and produces variables that are equivalent to the SIN and COS of the phase error. This phase information (i.e., SIN, COS) is forwarded to a derotater 100 which takes this phase information, as well as the samples from the sample buffer 62 without knowledge of rotation and phase space. The derotater 100 uses a standard derotation technique to re-rotate the (p, q) samples of the data field to yield (x, y) samples which take the phase estimate into consideration. These samples (x, y) are a soft decision type sample.

Since the processing satellites 12 are used in situations where there may be substantial noise or other perturbations and since the initial entry processor 40 is also required to discard colliding initial entry bursts 54 with high probability, the structure of the data field 60 includes a strong error control capability such as a concatenated structure. For example, a 60 symbol data field 60 in an initial entry burst 54 may be organized as 15 sets of four symbols out of the derotater 100, with each symbol using QPSK to form a two dimensional observable. Each set of four symbols is passed to an inner decoder 102. The four samples together are coded using an (8,4) biorthogonal standard maximum likelihood processing technique in the inner decoder 102 to yield a four bit decoded nibble. This process is repeated 15 times to yield 15 nibbles out of the inner decoder 102 which are passed to an outer decoder 104 for a (15, 5) Reed-Solomon code. It should be noted that one nibble equals one half a byte or four bits. The outer decoder 104 operates on a five, fifteen, Reed-Solomon decoding algorithm which attempts to decode the bits out of the inner decoder 102.

The information field of the IEP's codeword bears a 20 bit message (including the identity of the entering earth terminal) and this code can expunge up to five nibble errors. The probability of decoding correctly, when there are many errors as will arise with near certainty when two initial entry bursts collide) is small. In the example case this probability is about $2.5 * 10^{31\ 3}$. When the Reed-Solomon decoder 104 is unable to decode correctly, it provides an output 106, indicating a "decoder failure" and, when this event is sensed, the initial entry processor 40 rejects the initial entry burst 54 attempt and no further processing takes place until the next initial entry burst slot 52 arises. Note that a user terminal 14 which attempts the initial entry process and which does not receive a timely response from the network operations center 24 launches a subsequent initial entry burst 54 until such time as its initial entry burst 54 is responded to. Given that the probability of two user terminals 14 choosing the same time slot for their commissioning probe is small in the first place and its propensity to reject highly errored observables, the initial entry processor 40 is robust against concurrent initial entry, as required.

If the initial entry processor 40 successfully completes this second phase of its operation, it prepares a, short message for the onboard control processor in the processor satellite 12, with two data items consisting of:

(1) The measured time of arrival, in whole and fractional parts of a symbol epoch, that was formed during the first phase of processing (i.e., coarse error 78 and fine error 94). The whole part is formulated from the index and the even/odd status of the sample at which R0 was encountered and the fractional part is 6 as discussed above.

(2) The data content extracted from demodulating and decoding the data field 60 portion of the initial entry burst 54 (i.e., identity field 108).

This completes the operation of the initial entry processor 40.

The onboard control processor forms a message (typically a single ATM cell) addressed to the network operations center 24 and routes this to the downlink 18 which serves the network operations center 24. When the network operations center 24 receives this message, it notes the commissioning action of the entering terminal 14. The network operations center 24 selects a synch burst control slot for the entering terminal 14 and prepares a message to the terminal 14 (again typically in the form of an ATM cell addressed to the terminal 14) informing the terminal 14 of this reservation and of the timing error that was observed by the initial entry processor 40. This message is sent in the network operations center's 24 uplink 16, via the processing satellite 12 and into the downlink 18 serving the entering terminal 14. When the entering terminal 14 receives this message, it determines the amount of correction needed to its initial range estimate to compensate for the reported timing error. This range refinement value is saved in non volatile memory by the terminal 14 for future use in re-entering communications within the processing satellite 12.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claims is:

1. An initial entry processor for use in a processing satellite in a satellite based communications system, said initial entry processor comprising:

a buffer operable to store an initial entry burst transmitted from at least one of a plurality of a terrestrial terminals to said processing satellite;

a detection and timing circuit operable to detect said initial entry burst and determine a time of arrival of said initial entry burst relative to an initial entry burst slot, where the detection and timing circuit determines a coarse timing error and a fine timing error of said initial entry burst relative to said initial entry burst slot; and an identity circuit operable to determine an identity of said terrestrial terminal that transmitted said initial entry burst, wherein said time of arrival is used by said identified terrestrial terminal during subsequent communications with said processing satellite.

2. The initial entry processor as defined in claim 1 wherein said coarse timing error represents an integer number of one half symbols of misalignment of said initial entry burst relative to said initial entry burst slot.

3. The initial entry processor as defined in claim 2 wherein said fine timing error is no more than about one quarter of a symbol.

4. The initial entry processor as defined in claim 1 wherein said detection and timing circuit includes a correlator to correlate said initial entry burst and a modulus to determine a modulus of said correlated data.

5. The initial entry processor as defined in claim 4 further comprising a result buffer operable to store said modulus data and a peak locator operable to determine a maximum modulus from said modulus data.

6. The initial entry processor as defined in claim 5 further comprising a comparitor operable to compare said maximum modulus with at least a threshold value to determine a presence of said initial entry burst.

7. The initial entry processor as defined in claim 6 wherein said detection and timing circuit further includes a fine error function module operable to determine a fine timing error based upon modulus data before and after said maximum modulus.

8. The initial entry processor as defined in claim 7 wherein said identity circuit includes a trig function module operable to form an estimate of a SIN and COS of said correlated data from said correlators.

9. The initial entry processor as defined in claim 8 wherein said identity circuit further includes an inner decoder and an outer decoder operable to decode at least a portion of said initial entry burst to identify said terrestrial terminal that transmitted said initial entry burst.

10. The initial entry processor as defined in claim 1 wherein said initial entry burst includes an L symbol preamble and a D symbol data field, said L symbol preamble used by said detection and timing circuit to detect and determine said time of arrival of said initial entry burst relative to said initial entry burst slot and said D symbol data field used by said identity circuit to identify said terrestrial terminal that transmitted said initial entry burst.

11. An initial entry processor for use in a processing satellite in a satellite based communications system, said initial entry processor comprising:

buffer means for storing an initial entry burst transmitted from one of a plurality of terrestrial terminals to said processing satellite;

detection and timing means for detecting said initial entry burst stored in said buffer means and for determining a time of arrival of said initial entry burst relative to an initial entry burst slot; and identity means for determining an identity of said terrestrial terminal that transmitted said initial entry burst, wherein said time of arrival is used by said identified terrestrial terminal to re-enter communications with said processing satellite so as to have a reduced timing error between said terrestrial terminal and said processing satellite, wherein said initial entry burst includes an L symbol preamble and a D symbol data field, said L symbol preamble used by said detection and timing means to detect and determine said time of arrival of said initial entry burst and said D symbol data field used by said identity means to identify said terrestrial terminal that transmitted said initial entry burst.

12. The initial entry processor as defined in claim 11 wherein said initial entry burst slot includes said initial entry burst and a window positioned at a leading edge and a lagging edge of said initial entry burst slot.

13. The initial entry processor as defined in claim 11 wherein said detection and timing means determines a coarse timing error and a fine timing error, said coarse timing error represents an integer number of one half symbols of misalignment of said initial entry burst and said fine timing error is no more than one quarter of a symbol.

14. The initial entry processor as defined in claim 13 wherein said detection and timing means includes a correlator to correlate said initial entry burst and a modulus to determine a modulus of said correlated data.

15. The initial entry processor as defined in claim 14 wherein said detection and timing means further includes a result buffer operable to store said modulus data, a peak locator operable to determine a maximum modulus from said modulus data and a fine error function module operable to determine said fine timing error, said maximum modulus used for determining said coarse timing error by said peak locator and said modulus data before and after said maximum modulus used by said fine error function module to determine said fine timing error.

16. A method of performing initial entry of communications between a plurality of terrestrial terminals and a processing satellite, said method comprising the steps of:

transmitting an initial entry burst from one of the plurality of terrestrial terminals during an initial entry burst slot;

receiving the initial entry burst in an initial entry processor in the processing satellite;

detecting the initial entry burst and determining a time of arrival of the initial entry burst relative to the initial entry burst slot with the initial entry processor, including determining a coarse timing error and determining a fine timing error;

identifying the terrestrial terminal that transmitted the initial entry burst with the initial entry processor; and employing the time of arrival by the identified terrestrial terminal during subsequent communication with the processing satellite.

17. The initial entry method as defined in claim 16 wherein the step of identifying the terrestrial terminal that transmitted the initial entry burst further includes the step of determining an identity field that identifies the terrestrial terminal.

* * * * *